March 17, 1931.  R. C. LIVESAY  1,796,294

GRAIN BINDER

Filed Dec. 19, 1929

INVENTOR
ROBERT C. LIVESAY.

WITNESS
A. D. McLeay

BY
W. C. Jirdinstone
ATTY

Patented Mar. 17, 1931

1,796,294

UNITED STATES PATENT OFFICE

ROBERT C. LIVESAY, OF MOLINE, ILLINOIS, ASSIGNOR TO DEERE & COMPANY, OF MOLINE, ILLINOIS, A CORPORATION OF ILLINOIS

GRAIN BINDER

Application filed December 19, 1929.  Serial No. 415,180.

My invention relates to harvesting machines and more particularly to that type by the operation of which standing grain is cut and bound in bundles.

The object of my invention is to improve the binding mechanism so that lost motion, caused by wear of certain of the more active parts, is corrected and the initial efficiency of the machine is preserved. Other objects are disclosed in the following specification.

Referring to the drawings in which similar numerals indicate identical parts:

Figure 1:
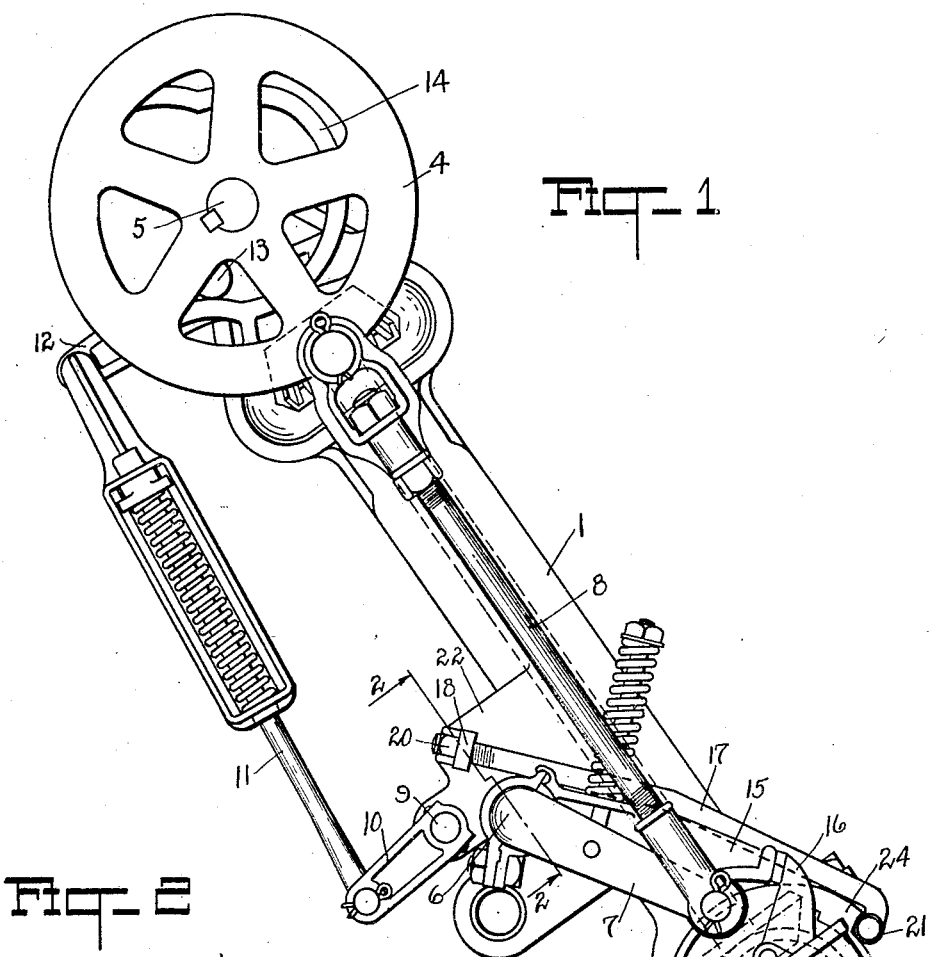
Fig. 1 is a front elevation of part of the binding mechanism of a harvester and embodies my invention.
Figure 2:
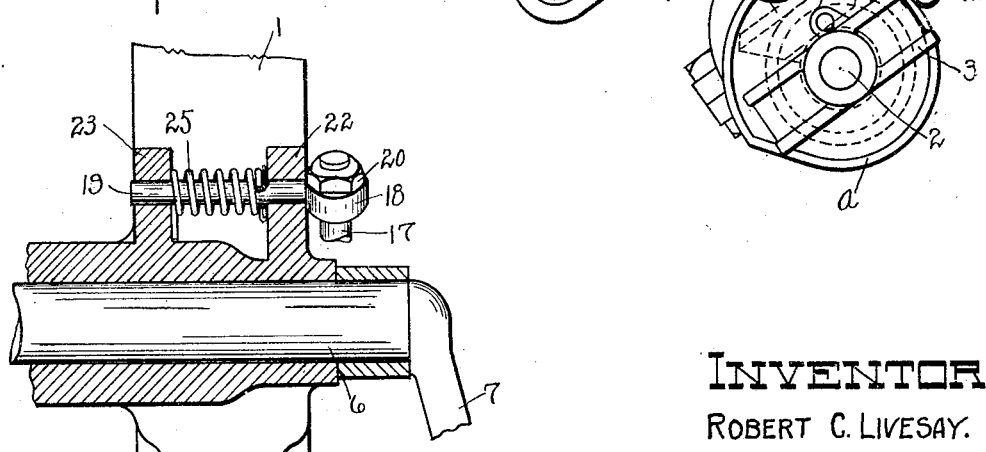
Fig. 2 is an enlarged detail section on the line 2—2 of Fig. 1.

The structure shown, to which my invention has been added, is well known in the art and includes the binder frame 1 on which the various parts comprising the binding mechanism are mounted. The power and packer shaft 2 is journaled in bearings on the frame 1 and carries the common type of clutch 3. As shown in dotted lines in Fig. 1, a bevel gear on the shaft meshes with a similar gear on a shaft housed in the vertical part of the binder frame 1 and having on its upper end a bevel gear meshing with gear teeth on a cam wheel 4, which is keyed on the knotter shaft 5. The needle shaft 6 is also journaled in suitable bearings on the frame 1 and terminates forwardly with a crank arm 7, to the end of which is pivotally attached the pitman 8, the latter extending upwardly and pivotally connected to the wheel 4. The compressor trip shaft 9 is journaled on an extension of the frame 1, and secured on one end thereof is an arm 10 to which is pivotally connected the link 11, the latter extending upwardly and pivotally joined to the lever 12, the opposite end of said lever being pivotally secured to the frame 1, and carrying intermediate its ends a roller 13 operating over a cam track 14 on the wheel 4. The clutch 3 is normally held out of operation by a dog 15 on the needle 6 contacting with the clutch dog 16 from which it is released when the binding mechanism is actuated.

The parts heretofore described and their operation are well known in the art, and are presented to more fully demonstrate the operation of my invention, which functions with the clutch to preserve the initial fitting of the parts described.

The vital part of a modern harvester and binder is the mechanism which forms and ties in bundles the cut grain; the active parts thereof are subjected to such forceful operation that the result is wear, which must be controlled or compensated for to preserve the perfect operation of the binding mechanism. The change from inaction to activity of the binding mechanism is abrupt, and so is the return of the mechanism to inaction; consequently, looseness of the parts caused by wear due to the changes must be prevented, and this I accomplish by my invention which consists of a dog 17, one end of which is threaded and extends through a threaded opening in an enlarged head 18 of a horizontal spindle 19, where it is held by a nut 20. The opposite end of the dog 17 is bent downwardly and on it is mounted a roller 21.

The spindle 19 is rotatably supported in projections 22 and 23 integral with the binder frame 1. The intermittently operating part $a$ of the clutch 3 is enlarged for part of its circumference to provide a shoulder 24 with which the bent end of the dog 17, carrying the roller 21, engages, in which position it is held by torsion of a coiled spring 25 on the spindle 19, one end of the spring being bent and inserted in a hole in the spindle 19, the opposite end being held against the frame 1. With this construction, it is evident that operation of the binding mechanism is controlled by the clutch; consequently a loose condition of the clutch part $a$ will result in a similar condition in other parts connected therewith, and noisy operation. This undesirable condition is cured by my invention for it is clearly manifest that when the dog 15 is raised from contact with the clutch dog 16, the clutch parts engage and operate to transmit power from the shaft 2 to actuate the binding mechanism, and as the clutch rotates, the roller 21 rides on the periphery of the clutch part and again engages with the shoulder 24 with re-engagement of the dog 15 with the clutch dog 16, the action of the dogs 15, 16 and 17 being so timed as to be simultaneous.

The dog 15 and the dog 16 come together with considerable force and in time looseness may result, which is corrected by turning the dog 17 in the part 18 until the desired adjustment has been obtained and secured by operation of the nut 20.

What I claim is—

1. In a grain binder, the combination of intermittently actuable binding mechanism, a power shaft, a clutch mounted on said shaft and having one of its parts in constant rotation therewith, a second part normally inert and connected with the binding mechanism, said second part adapted to be connected with the first part to transmit motion from said shaft to the binding mechanism, and means operating upon said second part to prevent loose movement thereof and of parts of the binding mechanism connected therewith when said clutch parts are disconnected.

2. In a grain binder, the combination of intermittently actuable binding mechanism and its frame, a power shaft, a clutch mounted on said shaft and having one of its parts in constant rotation therewith, a second part normally inert and connected with the binding mechanism, said second part adapted to be connected with the first part to transmit motion from said shaft to the binding mechanism, and a dog pivotally mounted on said frame and operating upon said second part to prevent loose movement thereof and of parts of the binding mechanism connected therewith when said clutch parts are disconnected.

3. In a grain binder, the combination of intermittently actuable binding mechanism and its frame, a power shaft, a clutch mounted on said shaft and having one of its parts in constant rotation therewith, a second part normally inert and connected with the binding mechanism, said second part adapted to be connected with the first part to transmit motion from said shaft to the binding mechanism, a shoulder on the periphery of the second part, and a dog pivotally mounted on the frame and engaging with said shoulder when said second part is at rest to prevent lost motion thereof and of parts of the binding mechanism connected therewith when said clutch parts are disconnected.

4. In a grain binder, the combination of intermittently actuable binding mechanism and its frame, a power shaft, a clutch mounted on said shaft and having one of its parts in constant rotation therewith, a second part normally inert and connected with the binding mechanism, said second part adapted to be connected with the first part to transmit motion from said shaft to the binding mechanism, a shoulder on the periphery of the second part, a dog pivotally mounted on the frame, a spring operating to hold the dog with constant pressure on the periphery of the second part when said clutch is in operation, and in contact with said shoulder when the clutch parts are disconnected.

ROBERT C. LIVESAY.